United States Patent
Deutsch et al.

(10) Patent No.: US 7,876,503 B2
(45) Date of Patent: Jan. 25, 2011

(54) BROADBAND ASYMMETRIC MIRRORS

(75) Inventors: Miriam Deutsch, Eugene, OR (US);
Alqing Chen, Eugene, OR (US);
Keisuke Hasegawa, Eugene, OR (US)

(73) Assignee: The State of Oregon Acting by and through the State Board of Higher Education on Behalf of the University of Oregon, Eugene, OR (US)

( * ) Notice: Subject to any disclaimer, the term of this patent is extended or adjusted under 35 U.S.C. 154(b) by 566 days.

(21) Appl. No.: 11/983,335

(22) Filed: Nov. 7, 2007

(65) Prior Publication Data

US 2008/0218887 A1      Sep. 11, 2008

Related U.S. Application Data

(60) Provisional application No. 60/858,181, filed on Nov. 9, 2006.

(51) Int. Cl.
*G02B 1/10* (2006.01)
(52) U.S. Cl. ........................ 359/584; 359/582
(58) Field of Classification Search ............... 359/584, 359/580, 582, 585–588
See application file for complete search history.

(56) References Cited

U.S. PATENT DOCUMENTS

| | | | |
|---|---|---|---|
| 5,385,114 A | 1/1995 | Milstein et al. | |
| 5,651,818 A | 7/1997 | Milstein et al. | |
| 5,688,318 A | 11/1997 | Milstein et al. | |
| 2004/0150818 A1 | 8/2004 | Armstrong et al. | |
| 2005/0175939 A1 | 8/2005 | Perlo et al. | |
| 2005/0270633 A1* | 12/2005 | Herman et al. | 359/321 |

OTHER PUBLICATIONS

Yu. V. Troitskii, Optics Spectrosc. 98, 125 (2005).
Rohde et al., Phys. Rev. Lett. 96, 045503 (2006).
Peterson et al., "Inorganic Metallodielectric Materials Fabricated Using Two Single Step Methods Based on the Tollen's Process," J. Colloid and Interface Science 306, 1, (2007).
Shelby et al., Science, 292, 77 (2001).
Chiba et al., "Conversion efficiency of 10.8% by a dye-sensitized solar cell using a TiO2 electrode with high haze," Appl. Phys. Lett. 88, 223505 (2006).
Grätzle, "Photoelectrochemical cells," Nature 414, 338 (2001).
Daudrix et al., "Characterisation of Rough Reflecting Substrates Incorporated Into Thin-film Silicon Solar Cells," Prog. Photovolt: Res. Appl. 14, 485 (2006).

* cited by examiner

*Primary Examiner*—Joshua L Pritchett
(74) *Attorney, Agent, or Firm*—Lumen Patent Firm

(57) ABSTRACT

An asymmetric mirror is composed of a dielectric substrate [500] and a coating [502] on the dielectric substrate. Within an operational wavelength range $\Delta\lambda$, the mirror has a transmission symmetry $\Delta T=0\%$ and a reflection asymmetry $\Delta R>10\%$, where the reflection asymmetry $\Delta R$ varies by less than 5% within the operational wavelength range $\Delta\lambda$. In addition, the wavelength range $\Delta\lambda$ is substantially broad, i.e., satisfies $\Delta\lambda/\lambda_{max}>10\%$. The coating [502] is a metamaterial having structural features smaller than the smallest operational wavelength, e.g., a nano-structured metamaterial such as a photonic crystal or a disordered nano-composite of a metal and a dielectric. In a preferred embodiment, the coating [502] is semi-continuous with a filling factor p between 70% and 75%. The dielectric may be, for example, air, vacuum, an electro-optic polymer, an optical gain material, an electro-active material, or a semiconductor.

8 Claims, 3 Drawing Sheets

BROADBAND ASYMMETRIC MIRRORS

CROSS-REFERENCE TO RELATED APPLICATIONS

This application claims priority from U.S. Provisional Patent Application 60/858,181 filed Nov. 9, 2006, which is incorporated herein by reference.

STATEMENT OF GOVERNMENT SPONSORED SUPPORT

This invention was made with Government support under contract NSF awarded by DMR-02-39273. The US Government has certain rights in the invention.

FIELD OF THE INVENTION

This invention relates generally to optical devices. More specifically, it relates to mirrors having an asymmetry in reflectance and a symmetry of transmittance with respect to light incident from opposing sides.

BACKGROUND OF THE INVENTION

An asymmetric mirror is a planar layered optical device exhibiting asymmetry in reflectance of light incident from opposing sides, while its transmittance is symmetric. Asymmetric mirrors are useful in applications such as specialized Fabry-Perot interferometer systems, as described in Yu. V. Troitskii, *Optics Spectrosc.* 98, 125 (2005). Asymmetric mirrors have been realized using smooth thin metal films on planar dielectric substrates, using corrugated metal films (gratings), and using multi-layer thin-film stacks. The optical characteristics of these mirrors, such as reflectance asymmetry and the associated bandwidth are typically constrained to a narrow range, due to a limited choice of materials. In particular, their reflection asymmetry $\Delta R$ is limited to 3% or less at optical wavelengths, and limited to 2% or less if invariance of $\Delta R$ across a broad wavelength range is required.

The general relations describing the energy balance in a two-way mirror are $$T_1 + R_1 + A_1 = 1$$

and $$T_2 + R_2 + A_2 = 1,$$

where T, R and A are the mirror transmittance, reflectance and losses (i.e., absorption and/or scattering), respectively, and the subscripts 1 and 2 specify the direction of light-incidence on the mirror. An asymmetric mirror is defined as a two-way mirror with reflection asymmetry and transmittance symmetry, i.e., $$\Delta R = R_1 - R_2 \neq 0 \quad (1)$$

and $$\Delta T = T_1 - T_2 = 0 \quad (2)$$

These two conditions imply that the material layers composing the mirror are not symmetrical with respect to light incident from opposing sides of the mirror and that there are energy losses or gains as the light interacts with the mirror (e.g., due to scattering or absorption).

One known structure for an asymmetric mirror is a thin metal film deposited on a dielectric substrate, embedded in a uniform dielectric. For example, a simple realization of asymmetric mirror known in the art is produced by depositing a thin silver film on a glass substrate, embedded in a vacuum. FIG. 1A is a graph illustrating for this type of asymmetric mirror the dependence of calculated values of $\Delta R$ on the film thickness for several different wavelengths in the visible wavelength range. The graph shows that the maximum reflection asymmetry $\Delta R$ is 3% for a film thickness of 20 nm and wavelength of 500 nm. However, $\Delta R$ drops to 1.5% at 850 nm, i.e., there is a 50% variation in $\Delta R$ across the visible wavelength range. This variation of $\Delta R$ is not desirable for many practical applications. A smaller variation in $\Delta R$ can be obtained by reducing the film thickness, but only by reducing the maximum reflection asymmetry $\Delta R$ to 2% or less. For example, FIG. 1B is a magnified view of the graph of $\Delta R$ versus film thickness showing that, for a film thickness around 8 nm, $\Delta R$ varies by about 10% across the visible wavelength range. The reflection asymmetry $\Delta R$, however, is reduced to 2%. This behavior shown in FIGS. 1A and 1B is typical to most metal films which are reflective in the visible and near-infrared (NIR) portions of the spectrum.

Clearly, it would be an advance in the art of optical devices to provide an asymmetric mirror with a significantly stronger reflection asymmetry over a broader range of wavelengths. In particular, it would be valuable for certain technological applications to increase the magnitude of $\Delta R$ significantly above 3% while simultaneously reducing the wavelength-dependent variation of $\Delta R$ significantly below 10%.

SUMMARY OF THE INVENTION

The present inventors have discovered that, using a dispersion-engineered metamaterial whose structure and composition are carefully selected to satisfy specific properties, asymmetric mirrors can be produced that have a reflection asymmetry $\Delta R$ larger than 10% with variations of less than 5% across a broad wavelength range.

In one aspect of the invention, an asymmetric mirror is provided which comprises a dielectric substrate and a coating on the dielectric substrate. The coating is a metamaterial having structural features smaller than an operational wavelength range $\Delta \lambda = \lambda_{max} - \lambda_{min}$ of the asymmetric mirror. The wavelength range $\Delta \lambda$ is substantially broad, i.e., satisfies $\Delta \lambda / \lambda_{max} > 10\%$. Within this wavelength range $\Delta \lambda$, the mirror has a transmission symmetry $\Delta T = 0\%$ and a reflection asymmetry $\Delta R > 10\%$. In addition, the reflection asymmetry $\Delta R$ varies by less than 5% within the operational wavelength range $\Delta \lambda$. In a preferred embodiment, the coating is semi-continuous with a filling factor p between 70% and 75%. In embodiments where the operational wavelength range $\Delta \lambda$ is within the range 500 nm to 850 nm (i.e., within the visible spectrum), the wavelength range $\Delta \lambda > 85$ nm and the metamaterial is nano-structured with structural feature sizes less than 500 nm. The nano-structured metamaterial may be, for example, a photonic crystal or a disordered nano-composite of a metal and a dielectric. The dielectric can be, for example, air, vacuum, an electro-optic polymer, an optical gain material, an electro-active material, or a semiconductor. The metal can be, for example, silver, gold, aluminum, or copper.

DETAILED DESCRIPTION

In designing asymmetric mirrors with controllable spectral response, it is important to understand the dependence of the reflectance asymmetry on the optical constants of the metal film, and in particular its dependence on optical losses. Accordingly, consider a thin film of thickness d and permittivity $\epsilon_f$ deposited on a semi-infinite substrate of permittivity $\epsilon_s$ embedded in vacuum. Solving Maxwell's equations for an electromagnetic field of frequency ω impinging on such a mirror, we find the reflectance asymmetry may be compactly written as $$\Delta R = R_1 - R_2 = |AB+C|^2 - |AC+B|^2 / \{|1+ABC|^2\}, \quad (3)$$

where $A \equiv \alpha^2 = e^{ikd}$, $B = r_{12}$, $C = r_{23}$, $k = \epsilon_f^{1/2} \omega / c$ and c is the speed of light in vacuum. We limit our discussion here to absorptive films, hence $\epsilon_f = \epsilon'_f + i \epsilon''_f$. The amplitude reflection coefficients $r_{12}$ and $r_{23}$ describe reflections from the vacuum-metal and metal-dielectric interfaces, respectively, and are given by standard textbook expressions. The numerator of Eq. 3 may be rewritten as $$(|\alpha|^4-1)(|B|^2-|C|^2)+2Re\{\alpha^2(BC^*-B^*C)\}. \quad (4)$$

From this it is easy to see that ΔR=0 whenever there is inversion symmetry such that B=−C, and/or when the materials are lossless, so that |α|=1 and B and C are both real. In general, however, the permittivity of the metal is a function of frequency, so a simple closed-form expression for ΔR is not always available.

Precise control of the optical response can be realized in metamaterials—artificial structures with engineered permittivities. These materials may consist of disordered metallodielectric nanocomposites or exhibit the long range ordering of photonic crystals. The present inventors have discovered that a disordered metal-dielectric metamaterial may be implemented to achieve broadband and highly asymmetric optical reflectors.

Figure 1A:
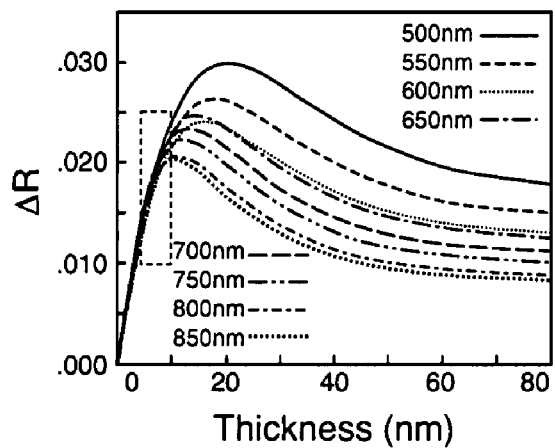
FIG. 1A is a graph of the calculated reflection asymmetry $\Delta R$ versus the film thickness for several different wavelengths incident on a conventional asymmetric mirror.
Figure 1B:
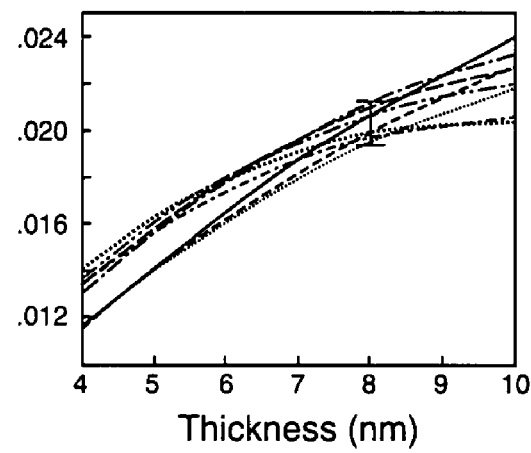
FIG. 1B is a magnified view of the graph of $\Delta R$ versus film thickness shown in FIG. 1A.
Figure 2A:
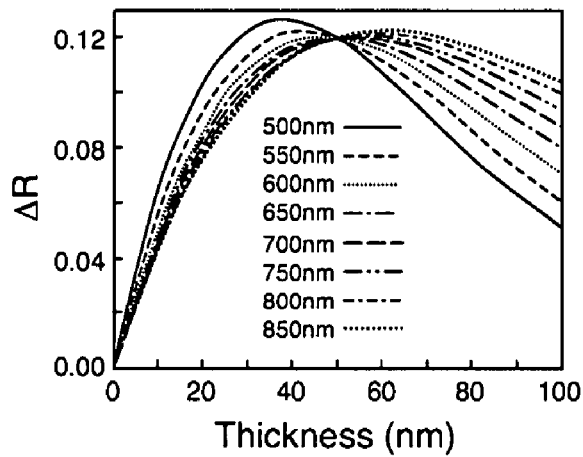
FIG. 2A shows a graph of designed ΔR versus film thickness for several wavelengths in an asymmetric mirror designed according to principles of the invention.

The design of such a mirror may begin with two desirable design constraints: (i) The reflection asymmetry is preferably large (i.e., ΔR>10%) and (ii) at a given film thickness the reflection asymmetry ΔR preferably does not vary with respect to wavelength (i.e., ∂(ΔR)/∂λ=0) within an operating wavelength range. FIG. 2A shows a graph of the designed ΔR versus film thickness for several wavelengths in the visible and NIR range. The functional form of ΔR was arbitrarily set to resemble that in FIG. 1A. The mirror is designed to have an exact crossover point for a film thickness of d=50 nm.

The permittivity $\epsilon_f(\lambda)$ can be extracted from the expression for ΔR by simple inversion. In particular, the resulting components $\epsilon'_f(\lambda)$ and $\epsilon''_f(\lambda)$ of the complex dielectric response $\epsilon_f(\lambda)$ are plotted versus wavelength in FIG. 2B as solid lines, where $\epsilon'_f$ and $\epsilon''_f$ are represented by red and blue, respectively. In general, for a given form of ΔR, there exists a wide range of values of d (up to about 50 nm) and ΔR (up to about 15%) for which the resulting permittivity satisfies the causality relations over the entire visible and NIR range.

Figure 2B:
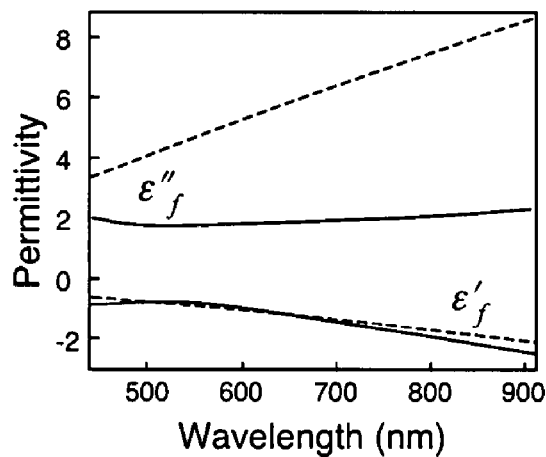
FIG. 2B is a graph of the real and imaginary components of the complex dielectric response corresponding to the designed ΔR of FIG. 2A (solid lines) and best fits to these obtained using Bruggemann effective medium theory (dashed lines).

As shown in FIG. 2B, $\epsilon'_f$ is negative over the entire visible range, implying the anticipated metallic response. However, $\epsilon''_f$ is significantly greater than the known values for silver, implying increased losses in this material, as expected. We also find that $|\epsilon'_f|$ and $\epsilon''_f$ increase when the crossover point is set for lower values of d. This means that the crossover is not limited to occur at the chosen thickness of 50 nm, but may be satisfied for different film thicknesses by adjusting the dielectric function to different values of $|\epsilon'_f|$ and $E''_f$. For large enough values of ΔR (about 15%), it is found that $\epsilon'_f > 0$ at short wavelengths, crossing over to negative values in the mid-visible range. This means that the material does not need to be metallic over the entire range of wavelengths. For certain spectral regions, such as the short wavelengths found in this example, the positive value of $\epsilon'_f$ implies the material is not behaving as a metal, but as a dielectric. When $\epsilon'_f$ crosses over to negative values the material exhibits metallic behavior at the corresponding frequencies.

Although the dielectric function graphed as solid lines in FIG. 2B has no realization as a thin metal film, the inventors have discovered that a similar dielectric response may be modeled in a composite metal-dielectric metamaterial using an effective medium approach. According to this approach, composite materials with spatial inhomogeneities of typical size much smaller than the relevant length scale of the system (i.e., optical wavelengths) may be treated as homogeneous on average. We apply the well-known Bruggemann effective medium theory (EMT) to model such a metal-dielectric metamaterial with a metal filling fraction p. The effective dielectric function $\epsilon_{eff}$ of this material is given by $$p \frac{\epsilon_m - \epsilon_{eff}}{g\epsilon_m + (1-g)\epsilon_{eff}} + (1-p) \frac{\epsilon_d - \epsilon_{eff}}{g\epsilon_d + (1-g)\epsilon_{eff}} = 0 \quad (5)$$

where $\epsilon_m$ and $\epsilon_d$ are known dielectric functions of the interpenetrating metal and the dielectric, respectively, and g=0.68 is a constant describing the microscopic morphology of the film's constituents, and is also known as the depolarization factor.

The dashed lines in FIG. 2B show the best-fits of $\epsilon'_f$ and $\epsilon''_f$ obtained using Bruggemann effective medium theory. The metal is chosen to be silver and the dielectric is vacuum. A value of p=71% yields the best agreement with the predicted dielectric function. The discrepancy in $\epsilon'_f$ (i.e., dashed blue versus solid blue) is attributed to microscopic details of the loss mechanism specific to the Bruggemann model.

Using the general principles illustrated above, it is now possible to design and fabricate asymmetric mirrors using metamaterials engineered to produce large and constant reflection asymmetry over a broad wavelength range. Moreover, since the effective optical response depends only on p (for a given choice of materials) the asymmetry may be tuned not only with film thickness (as in FIG. 2A) but also with metal filling fraction.

Figure 3A:
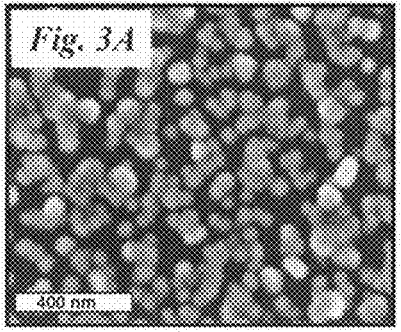
FIGS. 3A and 3C are scanning electron micrographs of semi-continuous metal coatings with different filling factors, illustrating a type of metamaterial coating used in embodiments of the invention.

In one embodiment of the invention, an asymmetric mirror designed for operating in the visible wavelength range is fabricated by depositing on a glass substrate a metamaterial in the form of a semi-continuous, nano-structured silver coating. The semi-continuous silver coating may be deposited using known techniques such as a modified Tollen's reaction, e.g., as described in Rohde et al., *Phys. Rev. Lett.* 96, 045503 (2006) and in Peterson et al., "Inorganic Metallodielectric Materials Fabricated Using Two Single Step Methods Based on the Tollen's Process," *J Colloid and Interface Science* 306, 1, (2007). The degree of surface coverage may be controlled by monitoring the chemical deposition time, with reactions lasting from 1 to 6 hours. This technique may be used to produce coatings with metal filling fractions p ranging from about 10% to 90%, as determined from high resolution SEMs using known image analysis methods. However, the filling fraction of the coating is preferably in the range from 70% to 75%. After deposition, samples are preferably stored under inert conditions to minimize silver oxidation. The typical polycrystalline and discontinuous morphology of silver coatings produced by this deposition method can be seen in the scanning electron micrographs (SEMs) in FIGS. 3A and 3C. The metal filling fraction of the coating in FIG. 3A is p=52% while that of the coating in FIG. 3C is p=93%. Both scale bars are 400 nm.

Figure 3B:
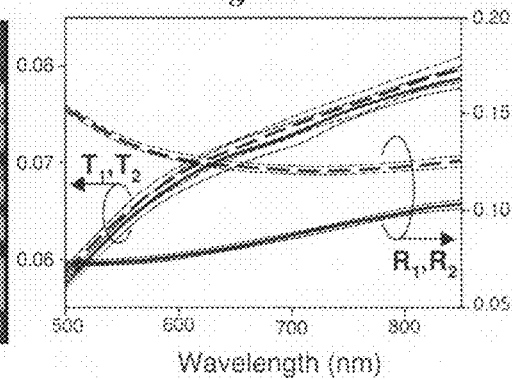
FIGS. 3B and 3D are graphs of the measured reflectances and transmittances of the two coatings pictured in FIGS. 3A and 3C, respectively.
Figure 3C:
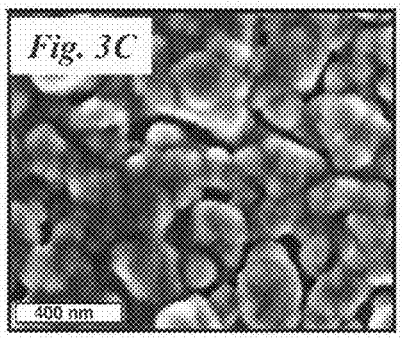
Figure 3D:
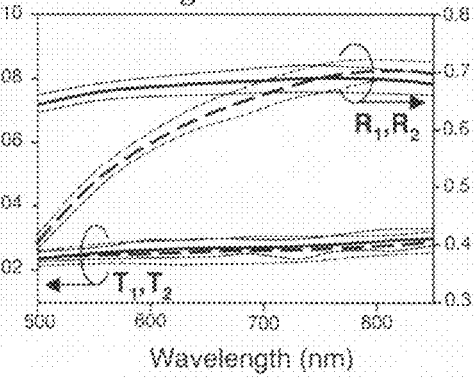

FIGS. 3B and 3D are graphs of the measured reflectances and transmittances of the coatings pictured in FIGS. 3A and 3C, respectively. Heavy lines are measured values. Thin lines indicate the range of error, obtained from averaging signals collected over large areas. The optical reflectance and transmittance values were measured using an inverted optical microscope with a 10× objective (0.25 numerical aperture) whose output port was directly imaged on the entrance slit of a 320 mm focal length spectrometer. Reflected and transmitted light signals from a tungsten-halogen white light illuminator impinging at normal incidence on each side of the sample were thus imaged onto a liquid-nitrogen-cooled charge-coupled device. The reflected signals were carefully is normalized by replacing the sample with a high-reflectance mirror. To eliminate spurious effects from local inhomogeneities in the metal coatings, the signals collected from ~1000 μm across the coating in each sample were then averaged.

As shown by comparing the two graphs of FIGS. 3B and 3D, the reflectance asymmetry depends on the filling fraction of the coating. In contrast, the transmittance is symmetric for all filling fractions, even for rough coatings with high surface coverage. The latter indicates that disorder-mediated (i.e. diffuse) scattering from the rough silver interfaces, typically assumed to be strong in discontinuous metal coatings, is not the major mechanism behind the large reflectance asymmetry. Therefore we are led to conclude that the main loss channel responsible for the effect is disorder-enhanced absorption.

Figure 4A:
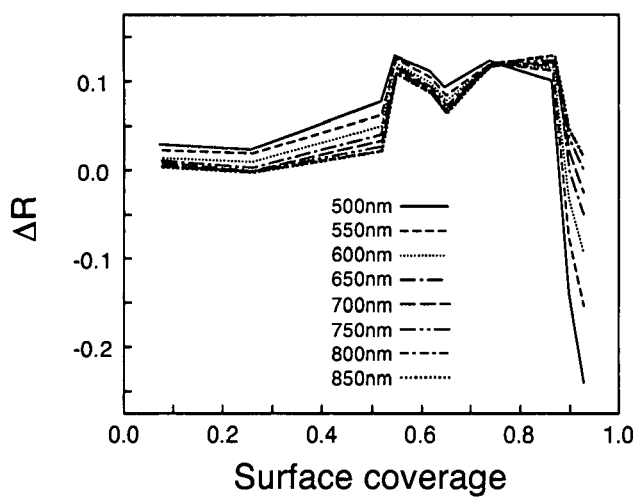
FIG. 4A is a graph of measured reflectance asymmetry ΔR versus metal filling fraction for ten coatings with increasing values of p, designed according to principles of the present invention.
Figure 4B:
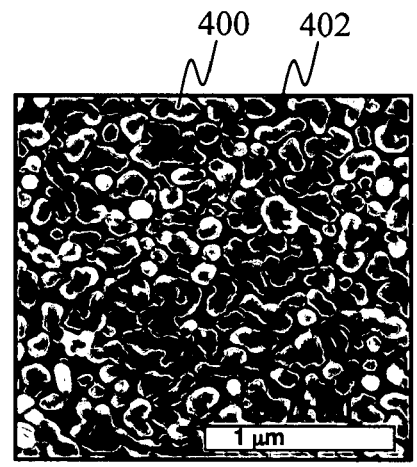
FIG. 4B is a scanning electron micrograph of a coating with a filling fraction of p=74% used in a preferred embodiment of the invention.

The measured reflectance asymmetry versus metal filling fraction is shown in FIG. 4A, where $\Delta R$ values are graphed for ten coatings with increasing values of p. Instead of plotting $\Delta R$ as function of coating thickness we plot it against p, as the filling fraction can be measured with much higher accuracy than the thickness of these rough coatings. As can be seen, both the magnitude and sign of $\Delta R$ depend strongly on surface filling fraction. The most noticeable feature is the theoretically predicted crossover point near p=74%. At this filling fraction, the variation of $\Delta R$ with respect to wavelength is negligible over the entire visible wavelength range. FIG. 4B is a SEM of a coating with p=74%. The filling fraction of the composite coating is defined in this context to refer to the volume fraction of the metal material 400 within the composite composed of the metal 400 and dielectric 402. The scale bar is 1000 nm. As the figure clearly shows, the structural feature sizes of the metal material 400 in this metamaterial coating are considerably smaller than 500 nm, the smallest operational wavelength of the mirror.

Comparing the experimental results in FIG. 4A to the predicted model in FIG. 2A yields good agreement for the general shape and trend of $\Delta R$, as well as for its maximum value of $\Delta R>10\%$. The functional form of $\Delta R$ in experiment, however, does differ from the theoretical model, especially near p=60%, where $\Delta R$ is non-monotonic. This is not surprising, since the detailed form of $\Delta R$ depends not only on the magnitudes of $\in'_f$ and $\in''_f$, but also on their dispersion. In particular, effective medium theories such as Bruggemann EMT used for modeling $\in_f$ are inadequate for accurate description of scattering at rough interfaces, and therefore serve only to approximate the optical response of the metamaterial. Whenever applying a scattering analysis such as that leading to Eq. 3 one assumes knowledge of the scattering boundary conditions. The latter are often not known for very rough and thin metal coatings whose optical response may be dominated by surface scattering and enhanced absorption. Indeed, we have computed $\in_f$ of our coatings using the measured filling fractions. Nevertheless, we reliably reproduce the reflection asymmetry for most values of p.

Figure 5:
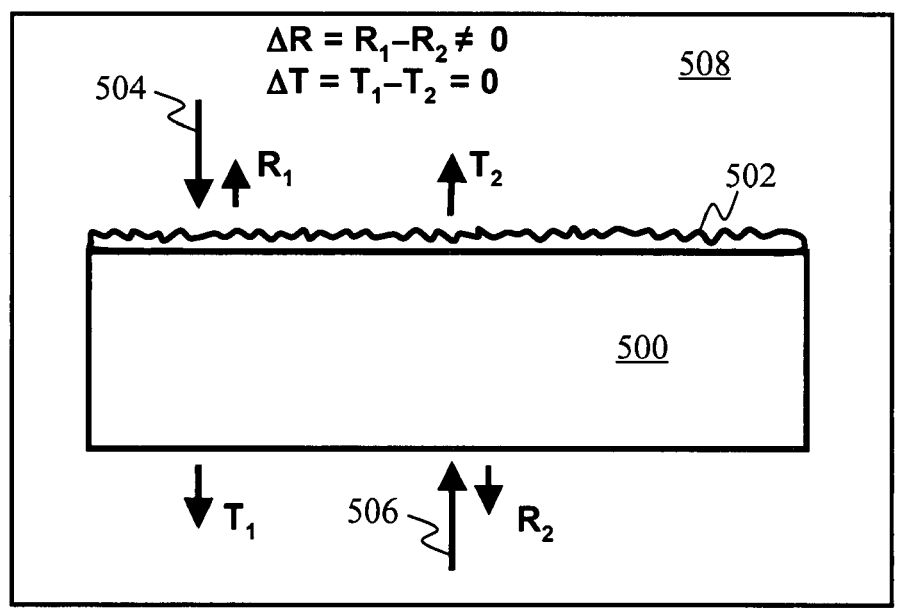
FIG. 5 shows a cross-section of an embodiment of an asymmetric mirror designed according to the principles of the present invention.

FIG. 5 shows a cross-section of an embodiment of an asymmetric mirror designed according to the principles of the present invention. The mirror is composed of a dielectric substrate 500 and a coating 502 on the dielectric substrate. In a preferred embodiment, the coating is semi-continuous with a filling factor p between 70% and 75%. In the case of a silver coating for a mirror designed for broadband use in the visible spectrum, the filling factor is preferably between 73% and 75%, and most preferably 74%.

The mirror is designed to operate in an operational wavelength range $\Delta\lambda = \lambda_{max} - \lambda_{min}$. Light with a wavelength $\lambda$ within this wavelength range may be incident on either of two opposing sides of the mirror, e.g., light beams 504 and 506. Different portions of incident light are reflected, absorbed, and transmitted, e.g., beam 504 has reflected portion $R_1$ and transmitted portion $T_1$, while beam 506 has reflected portion $R_2$ and transmitted portion $T_2$. Within the operational wavelength range $\Delta\lambda$, the mirror has a transmission symmetry $\Delta T=0\%$ and a reflection asymmetry $\Delta R>10\%$. In some embodiments, $\Delta R>12\%$. In addition, the reflection asymmetry $\Delta R$ varies by less than 5% within the operational wavelength range $\Delta\lambda$. In some embodiments, $\Delta R$ varies by less than 1%. The wavelength range $\Delta\lambda$ is substantially broad, i.e., satisfies $\Delta\lambda/\lambda_{max}>10\%$. In some embodiments, $\Delta\lambda/\lambda>20\%$, and in some embodiments, $\Delta\lambda/\lambda_{max}>40\%$.

The coating 502 is a metamaterial having structural features smaller than the smallest operational wavelength. Although the mirror can be designed for operation in the visible spectrum, it will be appreciated that the design principles are scale independent. Thus, embodiments of the invention can have operational wavelength ranges in other regions of the electromagnetic spectrum, e.g., infrared and microwave. In embodiments where the operational wavelength range $\Delta\lambda$ is within the range 500 nm to 850 nm (i.e., within the visible spectrum), the wavelength range $\Delta\lambda>350$ nm and the metamaterial is nano-structured with structural feature sizes less than 500 nm. The nano-structured metamaterial may be, for example, a photonic crystal, a disordered nano-composite of a metal and a dielectric, semiconductor quantum dots embedded in a dielectric such as a polymer or liquid crystal, self-assembled monolayers of quantum dots (either semiconductor or metal dots), or thin-film stacks (these are structures formed by stacking films of various compositions and thicknesses smaller than the operational wavelength. Possible film materials are polymers, inorganic salts, metals, metal oxides and semiconductors). The metal can be, for example, silver, gold, or aluminum (e.g., for operation at visible wavelengths), or copper (e.g., for operation at microwave frequencies). The dielectric can include, for example, air, vacuum, an electro-optic polymer, an optical gain material such as dye-doped polymers, or an electro-active material such as a liquid crystal. Instead of a dielectric it is possible to use a semiconductor (e.g., silicon). An embedding dielectric matrix 508 extending beyond the metamaterial coating may envelop the entire mirror. In some embodiments, this embedding dielectric 508 may have the same composition as the dielectric in the composite coating 502, as may be the case when the embedding dielectric 508 is air or vacuum and the composite is made of a semi-continuous metal coating and air or vacuum dielectric. In some embodiments, the embedding dielectric 508 may include other optical materials or elements to supplement or enhance the behavior of the mirror.

As described previously, metal-dielectric composite coatings can be fabricated using a modified Tollens process. Techniques for fabricating photonic crystals are described in U.S. Pat. Nos. 5,385,114, 5,651,818, and U.S. Pat. No. 5,688,318, all of which are incorporated herein by reference. Details regarding the fabrication of copper photonic crystals are described in Shelby et al., *Science*, 292, 77 (2001).

The effective-medium approach may be used to design metamaterial coatings with extended functionalities. Loss-compensated asymmetric mirrors may be realized by incorporating a gain medium into the composite coating 502 and/or the embedding matrix 508. Alternately, electro-active or semi-conducting materials may enable implementation of these mirrors in photonic devices, solar cells and full-color displays. Recent studies have shown that the incident-photon-to-current conversion efficiencies of photovoltaic cells containing semi-transparent hazy substrates are significantly higher than those of standard planar devices. See, for example, Grätzle, "Photoelectrochemical cells," *Nature* 414, 338 (2001); and Daudrix et al., "Characterisation of Rough Reflecting Substrates Incorporated Into Thin-film Silicon Solar Cells," *Prog. Photovolt: Res. Appl.* 14, 485 (2006). A hazy substrate is an asymmetric mirror having a thin and rough metal film which is either utilized as a semi-transparent metallic mirror or as one of the conducting electrodes in the cell. See Chiba et al., "Conversion efficiency of 10.8% by a dye-sensitized solar cell using a TiO2 electrode with high haze," *Appl. Phys. Lett.* 88, 223505 (2006). Enhanced light scattering induced by these hazy substrates leads to multiple scattering (particularly in the red portions of the spectrum) thus enhancing the overall optical path length and absorption efficiency of the trapped light. A significant contribution to the enhanced scattering comes from the excitation of plasmon resonances in the nanostructured metallic substrates. These resonances are particularly strong when feature size is in the range of several tens of nanometers. When designing metal substrates for spectrally-sensitive applications it is important to develop an understanding of the dispersive properties of these composite materials and the role plasmon resonances play in determining the latter. For example, the reflectance R of each side of a hazy semi-transparent mirror may vary strongly across the solar spectrum. Moreover, the difference, $\Delta R$ in the two reflectances is typically not constant for a large enough range of wavelengths, leading to selective trapping and absorption of the incident radiation in the cell. While the efficiency of a solar cell may increase with reflectance asymmetry, it may be further optimized if the dispersion in $\Delta R$ was minimal. We have shown that it is possible to fabricate rough metallic films with flat differential reflectance, such that the resulting asymmetry of the hazy mirror does not distort the spectrum of the incident white-light radiation.

Such broadband asymmetric mirrors can also be used for various purposes including minimizing broadband signal distortion and controlling/modulating light signals.

The invention claimed is:

1. An asymmetric mirror comprising:
   a dielectric substrate and a coating on the dielectric substrate;
   wherein the coating is a metamaterial having structural features smaller than an operational wavelength range $\lambda_{max}-\lambda_{min}$ of the asymmetric mirror;
   wherein the coating is semi-continuous with a filling factor between 70% and 75%;
   wherein the mirror has a transmission symmetry $\Delta T=0\%$ within the operational wavelength range $\lambda_{max}-\lambda_{min}$;
   wherein the mirror has a reflection asymmetry $\Delta R>10\%$ within the operational wavelength range $\lambda_{max}-\lambda_{min}$;
   wherein the reflection asymmetry $\Delta R$ varies by less than 5% within the operational wavelength range $\lambda_{max}-\lambda_{min}$;
   and wherein $(\lambda_{max}-\lambda_{min})/\lambda_{max}>10\%$.

2. The asymmetric mirror of claim 1 wherein the metamaterial is nano-structured, the operational wavelength range $\lambda_{max}-\lambda_{min}$ is within the range 500 nm to 850 nm, and $\lambda_{max}-\lambda_{min}>85$ nm.

3. The asymmetric mirror of claim 2 wherein the nano-structured metamaterial has structural feature sizes less than 500 nm.

4. The asymmetric mirror of claim 2 wherein the nano-structured metamaterial is a disordered nano-composite comprising a metal and a dielectric.

5. The asymmetric mirror of claim 1 wherein the dielectric comprises a material chosen from the group consisting of air, vacuum, an electro-optic polymer, an optical gain material, an electro-active material, and a semiconductor.

6. The asymmetric mirror of claim 1 wherein the metal is a material chosen from the group consisting of silver, gold, aluminum, and copper.

7. The asymmetric mirror of claim 1 wherein the nano-structured metamaterial is a photonic crystal.

8. An asymmetric mirror comprising:
   a dielectric substrate and a coating on the dielectric substrate;
   wherein the coating is a metamaterial having structural features smaller than wavelengths within an operational wavelength range, $\lambda_{max}$ to $\lambda_{min}$, of the asymmetric mirror;
   wherein the coating is semi-continuous with a filling factor between 70% and 75%;
   wherein the mirror has a transmission symmetry $\Delta T=0\%$ within the operational wavelength range;
   wherein the mirror has a reflection asymmetry $\Delta R>10\%$ within the operational wavelength range;
   wherein the reflection asymmetry $\Delta R$ varies by less than 5% within the operational wavelength range range;
   and wherein $(\lambda_{max}-\lambda_{min})/\lambda_{max}>10\%$.

* * * * *